3,839,466
PROCESS FOR PREPARING BETA,BETA'-BIS-(3,5-DICHLORO-4-HYDROXYPHENYL)-PROPANE
Fernando Montanari and Benedetto Calcagno, Milan, and Luciano Conti, Grizzana, Italy, assignors to Societa Italiana Resine S.p.A., Milan, Italy
No Drawing. Filed Dec. 22, 1971, Ser. No. 211,119
Claims priority, application Italy, Dec. 23, 1970, 33,465/70
Int. Cl. C07c 39/27, 39/30, 39/34
U.S. Cl. 260—619 A           8 Claims

ABSTRACT OF THE DISCLOSURE

Beta,beta'-bis(3,5 - dichloro-4-hydroxyphenyl)-propane is made by a chlorination reaction in methanol as solvent and in the presence of a chlorination catalyst and an inhibitor of free radical reactions.

---

The present invention relates to a process for the manufacture of beta-beta'-bis-(3,5-dichloro-4-hydroxyphenyl)-propane by chlorination, with gaseous chlorine, of beta, beta'-bis-(4-hydroxyphenyl)-propane dissolved in a solvent.

It is known that in the substitutive chlorination of organic compounds having benzene nuclei and paraffin side chains in the same molecule, it is possible to orientate the reaction mainly towards substitution by chlorine of the hydrogen in the nucleus, or in the paraffin chain, according to the conditions in which the process is performed.

Thus, for example, a more elevated chlorination temperature favours the substitution of the hydrogen in the paraffin chains, while low temperatures and the presence of a catalyst favour substitution of the hydrogen in the benzene nucleus. While it is possible to direct the reaction towards the prevalent formation of a specific type of compound, in practice, considerable difficulties are encountered when it is desired to limit chlorination essentially to purely the benzene nucleus or purely the paraffin chain.

Therefore, mixtures of variously chlorinated products are obtained which have to be subjected to troublesome processes for separation or purification.

In particular, in the preparation of beta, beta'-bis-(3,5-dichloro - 4 - hydroxyphenyl)-propane by using gaseous chlorine for the chlorination of beta, beta'-bis(4-hydroxyphenyl)-propane, even when working at low temperatures and in the presence of catalysts consisting of metal halides, reaction is difficult to control and just a slight excess of chlorine with respect to the stoichiometric quantity is sufficient to form compounds which are difficult to crystallise.

With a considerable excess of chlorine, substantial quantities of white crystalline product result which have a melting point equal to 147–148° C., which precipitates in the reaction medium. From analyses, it has been possible to establish that such a compound contains ten chlorine atoms per molecule.

In conclusion, even under the best conditions, a beta, beta'-bis-(3,5 - dichloro-4-hydroxyphenyl)-propane is obtained which is highly contaminated and difficult to purify and in addition there are low rates of reaction and the chlorine consumption is substantially higher with respect to the stoichiometric quantity required for chlorination.

It has now been found possible to eliminate or at least substantially to reduce the drawback described in the manufacture of beta, beta'-bis-(3,5-dichloro-4-hydroxyphenyl)-propane in processes in which gaseous chlorine is supplied to beta-beta'-bis-(4-hydroxyphenyl)-propane which is dissolved in a solvent.

One object of the present invention is therefore a process for the production of beta-beta'-bis-(3,5-dichloro-4-hydroxyphenyl)-propane which consists in obtaining a crude reaction product which can be purified by simple and not very expensive processes.

A further object of the present invention is a process which allows the production of beta, beta'-bis-(3,5-dichloro-4-hydroxyphenyl)-propane with a high reaction yield.

A further object of the present invention is the provision of a solvent suitable for the chlorination reaction of beta, beta'-bis-(4-hydroxyphenyl)-propane.

Further objects of the present invention will become manifest from the following description.

The process of the present invention consists essentially in supplying gaseous chlorine to beta, beta' - bis - (4-hydroxyphenyl)-propane dissolved in a solvent and in carrying out the chlorination reaction at low temperature and in the pressence of at least one substance having an accelerating effect on the chlorination reaction, and at least one substance with an inhibiting action on free radical type reactions.

More particularly, metal chlorides of variable valency, such as for example iron or copper chlorides, are used as catalysts for the reaction, being added to the reaction medium in quantities of 0.5 to 20 parts by weight to every 100 parts by weight of beta, beta'-bis-(4-hydroxyphenyl)-propane which is subjected to chlorination.

The substances inhibiting radical reactions are those known in the art as "antioxidizing agents," such as for example: cresols, thiocresols, p-terbutylcatechol, hydroquinone and the products of condensation of crotonic aldehyde with 3-methyl-6-terbutylphenol.

These substances are added to the reaction medium in quantities of 0.1 to 5.0 parts by weight to every 100 parts by weight of beta-beta'-bis-(4-hydroxyphenyl)-propane which is subjected to chlorination.

The objects of the present invention are best achieved when the chlorination catalysts and antioxidizing agents are added to the reaction medium in proportions of 1:1 to 10:1 by weight.

Still according to the present invention, chlorination reaction is performed in a solvent. It has been found that the best results are obtained by using methanol as a solvent, also it is possible to use aqueous methanol containing up to 30% by volume of water.

The beta, beta'-bis(4-hydroxyphenyl)-propane is dissolved in this solvent and gaseous chlorine is added to the agitated solution at temperatures not exceeding 20° C. and preferably ranging from 0 to 5° C.

By working under these conditions, beta, beta'-bis-(3,5-dichloro-4-hydroxyphenyl)-propane is formed with yields equal to or greater than 95% when a quantity of chlorine is added equal to or up to 15% greater than the stoichiometric quantity.

By working according to the present invention, it is possible substantially completely to avoid the formation of by-products, particularly those with a higher degree of chlorination, when an excess of chlorine is used. In fact, at the end of the chlorination reaction, excess chlorine emerges from the solution in an unaltered state.

The separation of beta, beta'-bis-(3,5-dichloro-4-hydroxyphenyl)-propane solution takes place by dilution with water, the temperature possibly being lowered in order to have the most complete separation possible.

In this way, the crude beta-beta'-bis-(3,5-dichloro-4-hydroxyphenyl)-propane is separated in the form of crystals with a melting point equal to or greater than 123° C.

A very pure product is obtained with a constant melting point of 127 to 129° C., by recrystallizing the crude product in an alcohol solvent, preferably methanol.

Finally, in view of the small quantity of by-products, the solvent used for the chlorination reaction can be easily purified by simple and not very expensive treatments.

EXAMPLE 5 g. of beta,beta'-bis-(4-hydroxyphenyl)-propane are dissolved in 30 ml. of methanol and 0.6 g. ferric chloride and 0.1 g. of the antioxidizing agent known commercially as "Topanol CA," obtained by condensing 3-methyl-6-terbutylphenol with crotonic aldehyde, are added, the condensation product being 1,1,3-tris(2-methyl-4-hydroxy-5-terbutylphenyl)butane.

The solution is cooled and 2.2 N litres of gaseous chlorine are added, the addition being regulated so as to maintain the temperature at between 0 and 5° C.

Under these conditions, the chlorine reacts instantly and there are no substantial losses of gas.

The reaction is arrested when chlorine starts to develop in excess.

By slow dilution with iced water at 0° C. and under brisk agitation, 7.7 g. beta,beta-bis-(3,5-dichloro-4-hydroxyphenyl)-propane are separated in the form of a crystalline and slightly yellowish product with a melting point of 123 to 125° C. After recrystallisation in methanol, a product with a melting point of 127 to 129° C. is obtained.

Analysis showed the crystallised product to have a carbon content equal to 49.85% and a hydrogen content equal to 3.07%. It should be noted that the theoretical levels for carbon and hydrogen equal 49.2% and 3.3% respectively.

What we claim is:

1. A process for the manufacture of beta,beta'-bis-(3,5-dichloro-4 - hydroxyphenyl)-propane comprising the steps of
    adding gaseous chlorine to beta,beta'-bis-(4-hydroxyphenyl)-propane which is dissolved in methanol, at working temperatures not exceeding 20° C. and in the presence of
    (a) at least one substance having a catalytic effect on the chlorination reaction, said substance being a metal chloride selected from the group consisting of iron and copper chlorides, and
    (b) at least one substance having an inhibiting effect on free radical reactions, said substance being an antioxidizing agent selected from the group consisting of cresols, thiocresols, p-terbutyl-catechol, hydroquinone and the products of condensation of crotonaldehyde with 3-methyl-6-terbutylphenol, continuing said chloride addition up to a quantity
    at least equal to the stoichiometric quantity for the chlorination reaction, and
    recovering beta,beta'-bis - (3,5-dichloro - 4-hydroxyphenyl)-propane from the products of the chlorination reaction.

2. A process according to Claim 1, characterised in that the metal chlorides of variable valency, used as catalysts for the chlorination reaction are present, in quantities ranging from 0.5 to 20 parts by weight to every 100 parts by weight of beta,beta'-bis-(4-hydroxyphenyl)-propane.

3. A process according to Claim 1, characterised in that the antioxidizing agents are used in quantities ranging from 0.1 to 5.0 parts by weight to every 100 parts by weight of beta,beta'-bis-(4-hydroxyphenyl)-propane.

4. A process according to Claim 1, characterised in that a ratio by weight of chlorination catalysts to antioxidizing agents of 1:1 to 10:1 is maintained.

5. A process according to Claim 1, characterised in that water is present in the solution of beta-beta'-bis-(4-hydroxyphenyl)-propane and methanol in an amount up to 30% by volume of the methanol.

6. A process according to Claim 1, characterised in that said chlorination reaction is carried out at temperatures from 0° to 5° C.

7. A process according to Claim 1, characterised in that beta,beta'-bis-(3,5-dichloro - 4-hydroxyphenyl)-propane is recovered from the products of reaction by dilution with water followed by recrystallization in methanol.

8. The process of Claim 7 wherein said dilution is carried out together with cooling.

References Cited
UNITED STATES PATENTS

| | | | |
|---|---|---|---|
| 2,254,904 | 9/1941 | Moss | 260—619 A |
| 2,961,373 | 11/1960 | Boyer | 260—619 A |
| 3,012,035 | 12/1961 | Knowles et al. | 260—619 A |
| 2,542,972 | 2/1951 | Thompson | 260—619 A |

JOSEPH E. EVANS, Primary Examiner